US000001383H

United States Statutory Invention Registration [19]

[11] Reg. Number: H1383

[43] Published: Dec. 6, 1994

Kaplan et al.

[54] SPACE-BASED TETHERED PHASED-ARRAY ANTENNA

[75] Inventors: Michael Kaplan, Springfield; Cynthia King, Alexandria, both of Va.

[73] Assignee: United States of America, Washington, D.C.

[21] Appl. No.: 868,665

[22] Filed: Mar. 31, 1992

[51] Int. Cl.[5] ..... H01Q 3/26; H04B 7/185

[52] U.S. Cl. ..... 342/372; 342/157; 342/354; 244/158 R

*Primary Examiner*—Bernarr E. Gregory

*Attorney, Agent, or Firm*—Thomas E. McDonnell; Charles J. Stockstill

[57] ABSTRACT

An unsupported, flexible, quasi-linear phased-array antenna within a space-based radar system which is tethered to a host satellite in free space. The antenna is formed by a plurality of antenna elements which are connected serially along a common axis. The antenna points in an Earth-pointing direction via gravity-gradient forces acting thereon. The phased-array antenna is capable of radiating a narrow electromagnetic beam in the end-fire direction along the array either in a spot or conical beam for detecting, identifying and tracking moving targets on or near the Earth's surface. According to one aspect of the invention, the phased-array antenna forms an elongated conductor which moves through a magnetic field in space for generating electrical power.

11 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SPACE-BASED TETHERED PHASED-ARRAY ANTENNA

FIELD OF THE INVENTION

The present invention relates generally to phased-array antennas and, more particularly, to a phased-array antenna for space-based radar systems which detects, identifies and tracks moving targets in predetermined regions on the Earth's surface.

BACKGROUND OF THE INVENTION

Phased-array antennas in conventional space-based radar systems that detect, identify and track targets near the Earth's surface are typically large monolithic antennas. These large arrays achieve high gains because if their large receiving aperture. Such phased-array antennas must use powerful transmitters and large, complex antennas to achieve a signal-to-noise ratio sufficient to perform moving target detection. Moreover, large supporting frames are required to hold large numbers of antenna array elements in a well-defined, fixed spatial orientation. The supporting frame adds to the mass and complexity of such systems.

The large number of antenna elements and the size of the supporting structure contribute significantly to the overall mass of space-based radar systems employing phased-array antennas. In addition, small deviations from the desired fixed array structure orientation cause significant loss in antenna gain, which greatly compromises system performance. As a result, space-based radar systems employing phased-array antennas are limited in flexibility, and difficult to deploy. In addition, phased-array antennas are expensive to manufacture, primarily because of the very large mass involved both in the antenna and its supporting structure.

Space-based array antennas are known. U.S. Pat. No. 4,843,397, for example, discloses a large distributed phased-array antenna for a space-based radar system. The antenna comprises a plurality of antenna array elements that are interconnected by a network of tensioning wires and pulling satellites to form a substantially planar, semi-rigid array. Each antenna array element is mounted on an individual elementary satellite that relays radar signals to a main satellite for processing and beam-forming.

SUMMARY OF THE INVENTION

An object of the present invention is to provide a low-mass, space-based, phased-array antenna to detect and track small targets on or near the Earth's surface.

Another object of the present invention is to provide a high gain space-based, phased-array antenna that can be produced and deployed at a lower cost than conventional phased-array antennas.

Another object of the present invention is to provide a space-based phased-array antenna having low mass and high gain which is easily manufactured using an unsupported, flexible, quasi-linear array geometry.

It is yet another object of the present invention to provide a space-based phased-array antenna having low mass and high gain which radiates an electromagnetic beam in the end-fire direction.

The foregoing and other objects of the invention are accomplished by providing a space-based, phased-array antenna comprising a plurality of antenna elements that are non-rigidly interconnected along a common axis by a plurality of connecting elements. The connecting elements are hollow, rigid structures which carry radar signals to individual antenna elements in the array. The interconnected elements form a flexible antenna structure having a quasi-linear geometry.

According to one aspect of the present invention, the phased-array antenna is tethered at one end to an Earth-orbiting satellite; the other end is left freely suspended in space. Gravity-gradient forces continuously orient the antenna array toward Earth. Position-determining correction methods realign the radar beam back onto target axis when oscillations distort the shape of the antenna.

BRIEF DESCRIPTION OF THE DRAWINGS

The preferred embodiments will best be understood from the following detailed description while referring to the drawings, in which.

DESCRIPTION OF THE PREFERRED EMBODIMENTS

Figure 1:
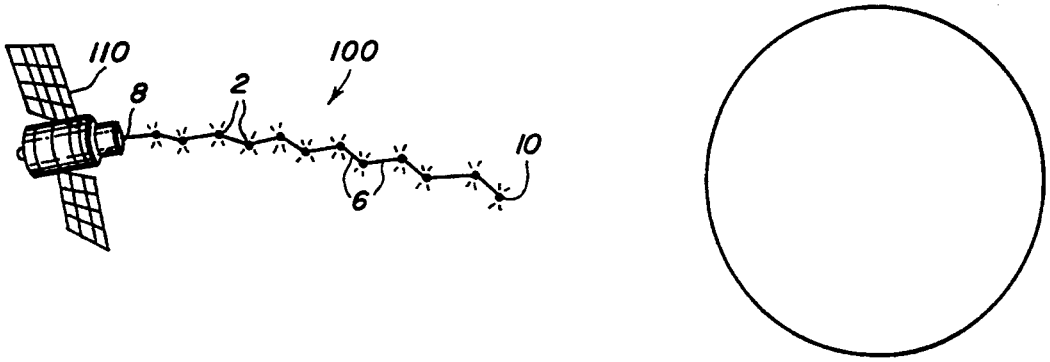
FIG. 1 is a diagrammatic illustration showing a tethered phased-array antenna of a space-based radar system in accordance with the present invention.
Figure 2:
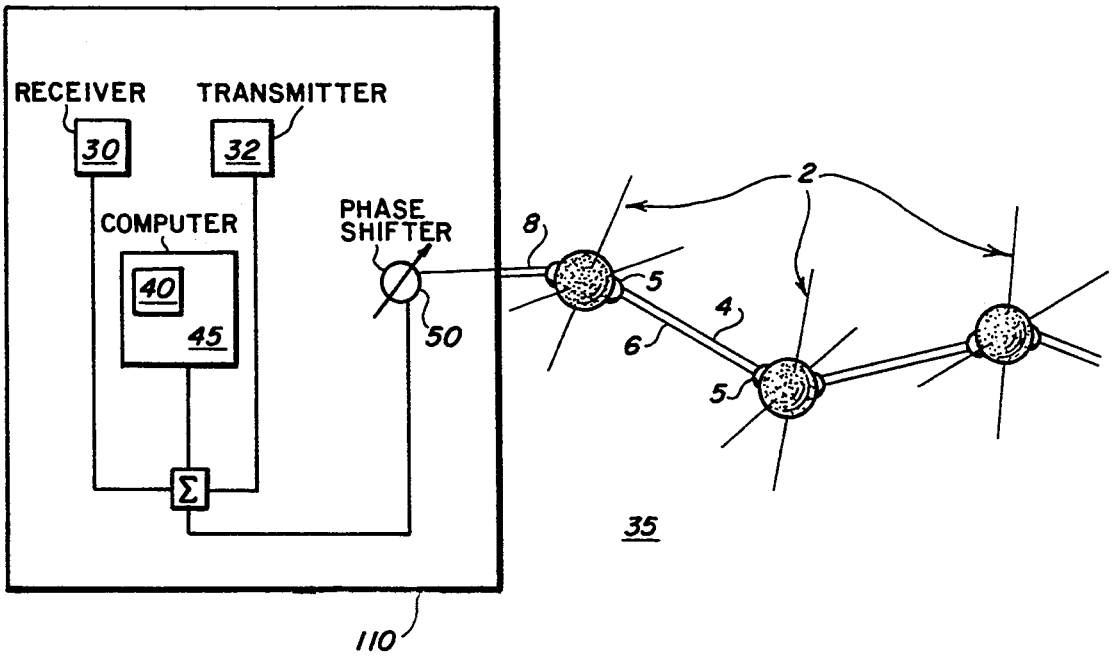
FIG. 2 is a block diagram of a radar control system usable with the tethered phased-array antenna in accordance with the present invention.

Referring to FIG. 1, a phased-array antenna 100 comprises a plurality of individual antenna elements 2 coupled in a substantially linear array by a plurality of connecting elements 6. Preferably, each connecting element 6 comprises a pair of flexible joints 5, i.e., a flexible rotary coupling or a ball-and-socket joint, wherein each flexible joint 5 operatively connects to one end of a connecting tube 4, as shown in FIG. 2. Thus, pairs of antenna elements 2 coupled by connecting elements 6 advantageously form phased-array antenna 100 having a flexible, quasi-linear geometry, i.e., a generally linear longitudinal axis, to illuminate a region of the Earth's surface. Preferably, antenna elements 2 are cross-dipoles, which are axially-symmetric broadband radiating elements whose motions or revolutions about the phased-array antenna 100 axis do not distort the electromagnetic beam.

Phased-array antenna 100 is a substantially unsupported, flexible structure that has end 8 tethered to an Earth-orbiting host satellite 110 while end 10 is unsupported. Phased-array antenna 100 is capable not only of bending along its length in an S-shaped curve, but also deflecting about host satellite 110.

Although antenna 100 supports a large number of antenna elements 2, it retains a low mass-to-size ratio since no supporting frame is required to hold the antenna in a fixed orientation. The large number of antenna elements 2 within antenna 100 increases the effective receiving aperture and power gain which, in turn, increases the power-aperture product. That is, the transmitter power is multiplied by the square of the antenna gain. This large power-aperture product produces a proportionally large signal-to-noise ratio for detecting and tracking a moving target.

According to one aspect of the present invention, phased-array antenna 100 is a dual transmit/receive antenna for a monostatic radar. According to another aspect of the present invention, phased-array antenna 100 is a separate transmit or receive antenna for a bistatic radar. In either aspect, phased-array antenna 100 allows satellite 110 to detect, identify, and track small airborne targets of interest—such as cruise missiles—in selected regions on the Earth's surface.

Referring to FIG. 2, host satellite 110 contains a radar system 35 that comprises a conventional transmitter 32 and conventional receiver 30 for transmitting and receiving radar signals responsive to a control computer 45. Computer 45 provides processing control signals to control receiver 30 and transmitter 32. A phase shifter 50 couples receiver 30 and transmitter 32 to phased-array antenna 100 and controls the radar signal phase in response to beam steering processor 40. Phase shifter 50 alters the phase of the radar signals transmitted to or received by phased-array antenna 100 at each of the antenna elements 2 based on phase control signals, thereby steering the resultant electromagnetic beam in the desired direction. Beam steering processor 40 advantageously is contained within radar control computer 45 and sends phase control signals to phase shifter 50 in response to control signals provided by computer 45. Beam steering processors of this type are disclosed, for example, in U.S. Pat. No. 4,445,119.

When transmitting, a system of conventional, low-loss, lightweight transmission lines (not shown) passes through the interior of each connecting element 6. These transmission lines carry and carries radar signals from transmitter 32 to each antenna element 2 in response to control signals from radar control computer 45. Thus, each antenna array element 2 transmits a separate radar signal that is phase shifted by phase shifter 50 under the control of beam steering processor 40. Phased shifted radar signals from each element are vectorially added to generate a powerful, directive, electromagnetic beam that scans a very large geographical area with a very short revisit time. The resulting radiation pattern from phased-array antenna 100 has a strongly pronounced main lobe and extremely low sidelobes.

The radar signal entering each antenna element 2 differs in phase from the signal entering each other antenna element 2 within the array. The required phase shift is a function of the spacing distance between antenna elements 2 along phased-array antenna 100 and is given by $$\phi=(2\pi d/\Gamma)\times\sin\Theta. \quad (1)$$

Here $\phi$ is the phase shift on an antenna element 2, d is the spacing distance of antenna elements 2 within phased-array antenna 100, $\Gamma$ is the operating wavelength, and $\Theta$ is the direction of the incoming/outgoing radiation. (By the reciprocity principle, the incoming and outgoing radiation are equal in the monostatic radar.) Preferably, spacing distance d is between about 1/5 and 1/6 $\Gamma$. F. By vectorially adding radar signals transmitted from each radiating antenna element 2 across the face of the antenna's aperture, a resultant electromagnetic beam is formed whose shape and direction is directly proportional to the relative phases and amplitudes of the radar signals passing into each array element 2. The frequency range at which antenna 100 operates satisfactorily has not been determined, but it presently appears that performance is better at relatively low frequencies, i.e., the HF, VHF and UHF frequency ranges (between 3 MHz and 1 GHz).

According to one aspect of the present invention, gravity-gradient forces imposed on phased-array antenna 100 tend to direct unsupported distal end 10 toward an optimum Earth-pointing orientation. No additional energy or control apparatus is required to maintain this direction.

Figure 3:
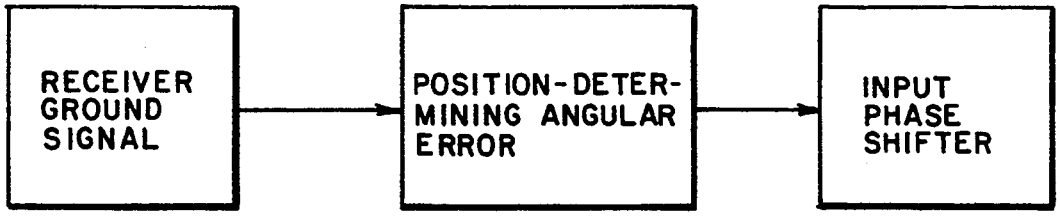
FIG. 3 is a flow chart showing the calibration of the tethered phased-array antenna in accordance with the present invention.

Referring to FIG. 3, a flow chart shows a three-step process which uses self-coherence to calibrate antenna 100. In step 1, receiver 30 receives signals transmitted from one or more ground stations that have known locations. A self-coherence algorithm in radar control computer 45 directs the antenna's electromagnetic beam towards one or more of these ground stations, or calibration targets. In step 2, the beam is steered to within a predetermined, e.g., 10°, angular error off target axis. The closer the electromagnetic beam is to the calibration target, the smaller the detected scan noise. In step 3, beam steering processor 40 calculates the phase shift required for phase shifter 50 to adjust the phase in individual antenna elements 2 so as to radiate the electromagnetic beam in the direction of minimum scan noise. This calibrates the antenna.

Figure 4:
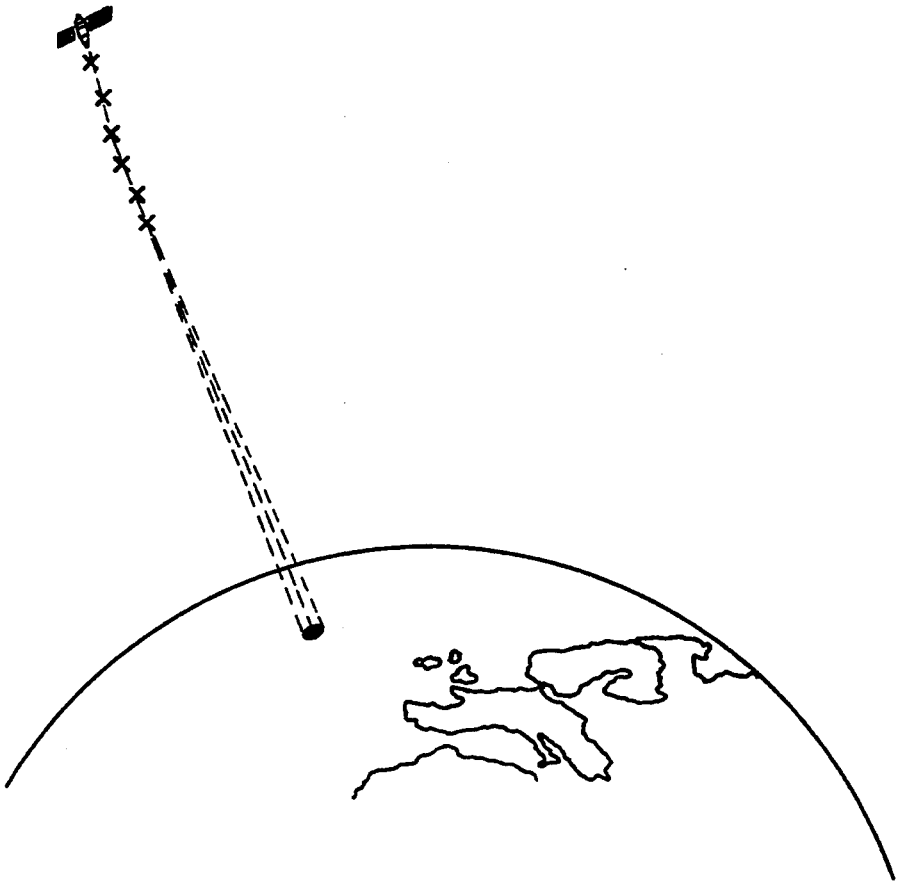
FIG. 4 is an illustrative diagram showing spot-beam illumination produced by the tethered phased-array antenna in accordance with the present invention.
Figure 5:
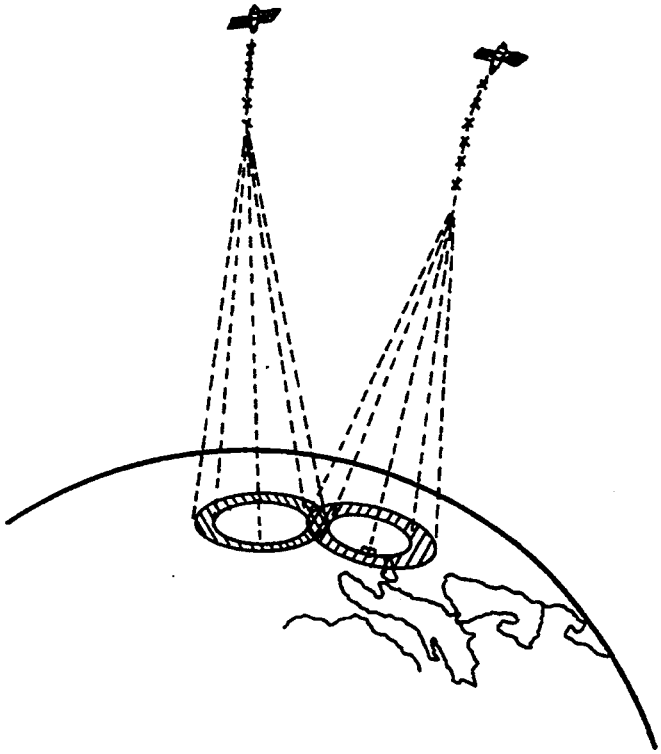
FIG. 5 is an illustrative diagram of conical-beam illumination produced by the tethered phased-array antenna in accordance with the present invention.

Varying the relative phases of the currents entering each element 2 electronically steers the resulting electromagnetic beam from phased-array antenna 100 to illuminate specific regions on the Earth's surface. For example, FIG. 4 is an illustrative case where the beam is primarily end-fired to provide a beam that covers a small spot on the Earth's surface. FIG. 5 shows an illustrative case of a beam steered a few degrees off the axis of antenna 100. The steering produces a beam pattern that, as shown in FIG. 5, is an annular ring around the axis of phased-array antenna 100. (FIG. 5 also illustrates two satellite mounted antennas 100 providing overlapping ring coverage of two adjacent regions.) For frequencies less than cutoff frequency, typically $f_c = 500$ MHz, communicating the phase information that is computed within beam steering processor 40 to single phase shifter 50 advantageously steers the electromagnetic beam. Phase information sent to phase shifter 50 effectively changes the absolute phase of the current entering each element 2 of antenna array 100 thereby redirecting the beam onto a specific target axis.

The normal, Earth-pointing, quasi-linear orientation of phased-array antenna 100 is disturbed by the presence of perturbing forces such as solar radiation pressure, Lorentz forces, lunar gravitational forces, and by inaccurate initial satellite deployment. These perturbations induce ripples or oscillations along the length of phased-array antenna 100 that displace selected antenna elements 2 off axis. Since for optimum operating frequencies $f<f_c$ such oscillations are small in relation to the operating wavelength of the antenna, these oscillations produce minimal distortion in the direction of the electromagnetic beam. Thus, only a single phase shifter 50 located at the series input of phased-array antenna 100 is required to direct the beam.

When $f>f_c$, the oscillations are comparable to the operating wavelength of the antenna: antenna elements 2 displaced off the centerline of antenna 100 will stagger the beam away from the desired location. These effects reduce antenna gain and threaten the ability of system 35 to detect moving targets. To control the antenna's radiation pattern for $f>f_c$, the geometrical configuration of each antenna element 2 must be known at all times. Controlling the phase of the signal received by each antenna element 2 controls the antenna's radar signal. Therefore, changing the phase on the displaced elements 2 overcomes the oscillation effects within antenna 100.

According to another aspect of the present invention, a computer model is used to calibrate antenna 100. The model predicts the behavior of array elements 2 based on their position and the type and severity of the perturbing forces. The computer model stochastically predicts the position and the degree of flexure that each element 2 will experience in response to these forces. Beam steering processor 40 then computes the required phase shift to compensate for the predicted oscillations.

Figure 6:
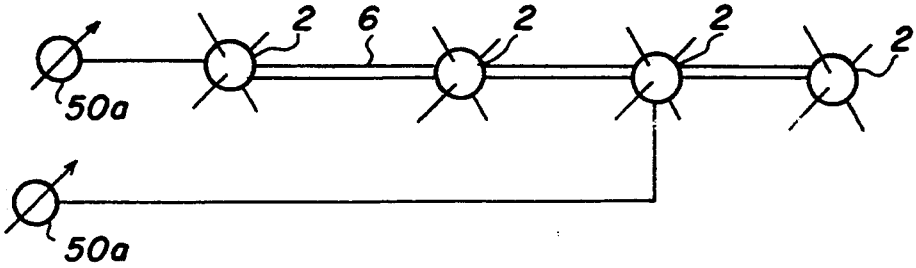
FIG. 6 is a schematic block diagram showing a phased-array antenna having a plurality of subarrays according to the present invention.

According to still another aspect of the present invention, as shown in FIG. 6, phase shifter 50 comprises a plurality of phase shifters 50*a*, each of which is coupled to a subarray of corresponding elements 2 within phased-array antenna 100. For large oscillations or when $f>f_c$, beam steering processor 40 outputs phase shift signals to each phase shifter 50*a* thus changing the phase shift on elements 2 that are deflecting off axis. Changing the phase shift on antenna elements 2 steers the electromagnetic beam back onto the target axis. When extremely severe oscillations occur along the antenna, or for operating frequencies $f>>f_c$, a phase shifter is placed at the input of each antenna element 2 in the array to redirect the stray beam back onto the target axis.

According to another aspect of the present invention, phased-array antenna 100 is a conductor moving through the earth's magnetic field. Thus, phased-array antenna 100 induces a current in the array structure that can provide power to satellite 110.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A phased-array antenna for use in a space-based radar system that radiates a narrow, steerable, electromagnetic beam in a specified direction to detect, identify and track targets on or near the surface of the earth, said antenna comprising:

a plurality of antenna elements having a predetermined spacing from one another;

interconnecting means for operatively interconnecting said antenna elements to form an array having a proximal end operatively connected to a satellite and a distal end, said distal end being unsupported and unfixed; and communications means disposed within said interconnecting means for conveying radar signals between said satellite and said antenna elements.

2. The phased-array antenna as in claim 1, further comprising a means for producing phase shift control signals for controlling the phase of said radar signals, thereby steering a resultant beam produced by said antenna.

3. The phased-array antenna system as in claim 1, wherein said antenna elements are non-rigidly connected by said interconnecting means such that said antenna is bendable both along its length and about said satellite.

4. The phased-array antenna as in claim 1, wherein said antenna elements are interconnected to form a substantially linear array.

5. The phased-array antenna system as in claim 1, wherein said predetermined spacing is between approximately 1/5 and 1/6 Γ.

6. The phased-array antenna system as in claim 1, wherein said array of antenna elements radiates said electromagnetic beam in a substantially end-fire direction.

7. The phased-array antenna system as in claim 1, wherein said first and second antenna elements are cross-dipole radiating antennas.

8. A phased-array antenna for use within a space-based radar system which provides a steerable, end-fire, electromagnetic beam to detect, identify and track targets on or near the surface of the earth, comprising:

a plurality of antenna elements having a predetermined spacing from one another and receiving phase shifted radar signals so as to produce said beam; and interconnecting means for operatively connecting said first and second antenna elements to form an array having a proximal end operatively connected to a satellite and a distal end, said distal end being unsupported and unfixed.

9. The phased-array antenna system as in claim 8, further comprising means for producing phase shift control signals for controlling the phase of said radar signals, thereby steering a resultant beam produced by said antenna.

10. The phased-array antenna system as in claim 9, wherein said predetermined spacing is between approximately 1/5 and 1/6 Γ.

11. The phased-array antenna system as in claim 9, wherein said antenna elements are cross-dipole radiating antennas.

* * * * *